United States Patent

[11] 3,577,620

| [72] | Inventors | George J. Hoffman<br>Northfield;<br>William O. Setele, Independence; Lester E.<br>Law, North Royalton, Ohio |
|---|---|---|
| [21] | Appl. No. | 853,445 |
| [22] | Filed | Aug. 27, 1969<br>Division of Ser. No. 774,031 Nov. 7, 1968,<br>Pat. No. 3,514,804 |
| [45] | Patented | May 4, 1971 |
| [73] | Assignee | Kindale Industries, Inc.<br>Independence, Ohio |

[52] U.S. Cl. .................................................. 29/148.4A,
16/26, 29/149.5B, 29/441
[51] Int. Cl. .................................................... B23p 11/00,
B23p 19/00
[50] Field of Search ......................................... 29/148.4,
148.4 (A), 441, 149.5, 149.5 (B); 16/26

[56] References Cited
UNITED STATES PATENTS
| 3,213,518 | 10/1965 | Saito ........................... | 29/148.4A |
| 3,514,804 | 6/1970 | Hoffman et al. ............... | 16/26 |

*Primary Examiner*—Thomas H. Eager
*Attorney*—Woodling, Krost, Granger and Rust

[54] BALL CASTER AND METHOD MAKING THE SAME
3 Claims, 4 Drawing Figs.

ABSTRACT: Method of assembling the caster parts and locking them in assembled condition of a ball-type caster.

PATENTED MAY 4 1971

3,577,620

INVENTORS
GEORGE J. HOFFMAN
WILLIAM O. SETELE
LESTER E. LAW

BY
ATTORNEYS.

3,577,620

BALL CASTER AND METHOD MAKING THE SAME

RELATION TO OTHER CASES

This application is a division of our application Ser. No. 774,031, filed Nov. 7, 1968, now U.S. Pat. No. 3,514,804, granted June 2, 1970.

Our invention relates to a method of making ball-type casters having a plurality of backup balls rollingly engaging a load-carrying ball.

An object of our invention is to provide an efficient and economical method of making our improved ball caster.

Other objects and a fuller understanding of this invention may be had by referring to the following description and claims, taken in conjunction with the accompanying drawing, in which:

Figure 1:
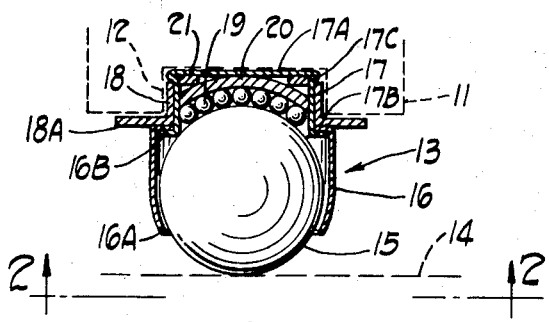
FIG. 1 is a vertical cross-sectional view through a preferred form of our caster in assembled condition.

Our improved ball caster is denoted generally by the reference character 13. The caster has a relatively large load-carrying ball, preferably a steel ball, denoted by the reference character 15. This load-carrying ball 15 is accommodated in and retained in a metal sleeve member 16, the lower end portion 16A of which is reduced or contracted to a diameter less than maximum diameter of the ball 15 whereby the ball 15 is locked in the sleeve 16 and cannot fall down through the open bottom end thereof.

Disposed above the sleeve 16 is a metal cup member 17 having its open end directed downwardly in registration with the upper open end of the sleeve member 16. There is an outturned flange 17B at the lower open end of the cup member 17 and there is an inturned flange 16B on the upper end of the sleeve member 16. These flanges 16B and 17B are interlocked with the flange 16B positioned above, and in engagement with, the flange 17B.

Figure 2:
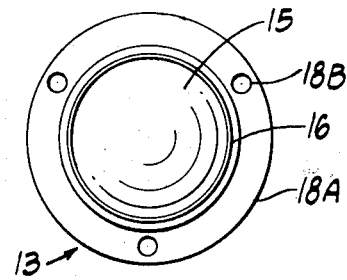
FIG. 2 is a bottom plan view of our caster looking in the direction of the arrows 2–2 of FIG. 1.

Disposed concentrically around the outer cylindrical wall of the cup member 17 is a metal annulus 18. This annulus 18 has a flange portion 18A extending radially outward from the cylindrical portion of the annulus 18. Three screw-accommodating openings 18B are provided in the flange portion 18A as seen in FIG. 2.

Disposed within the cup member above, and in engagement with the top spherical surface of, ball 15 are a plurality of backup balls 19. These balls 19 extend in all lateral directions over the top of the ball 15 and provide a rolling friction-resisting engagement therewith. FIG. 1 shows the balls 19 in one vertical plane coinciding with the plane of the drawing. However, it is understood that the balls 19 extend in all vertical planes passing through the center of ball 15.

Also disposed within the cup member 17 and above and in engagement with the balls 19 is a concave disc member 20. This disc member has a semispherical concave surface engaging the balls 19 and which surface complements the upper spherical surface of the ball 15. The balls 19 are in rolling engagement with this concave surface of the disc member 20.

Also disposed within the cup member 17 above the disc member 20 and intermediate the disc member 20 and the end wall 17A of the cup member 17 is a metal washer or annular member 21. It is to be noted that the washer 21 is disposed adjacent the outer cylindrical wall of cup member 17 so as to provide bracing or support to the disc member 20 around the peripheral edge portion thereof. By reason of the curvature of the disc member 20 as seen in FIG. 1 the washer 21 is disposed within the space left between the end wall 17A and disc member 20 and thus provides backing support where needed.

The annulus 18 is held down firmly against the interlocked flanges 16B and 17B by a ledge or shoulder 17C extending radially outward over the top edge of the annulus 18. The locking of the annulus 18 in position also holds the flanges 16B and 17B in the interlocked position illustrated in FIGS. 1 and 3. The ledge or shoulder 17C is formed of the end wall 17A being peened or deformed radially outward so as to be compressed downwardly over the upper edge of annulus 18. The dimensions of the parts are such that the washer 21, disc member 20, balls 19 and ball 15 are all held in the assembled position illustrated in FIG. 1 by the ledge or shoulder 17C locking the parts together as described.

Figure 3:
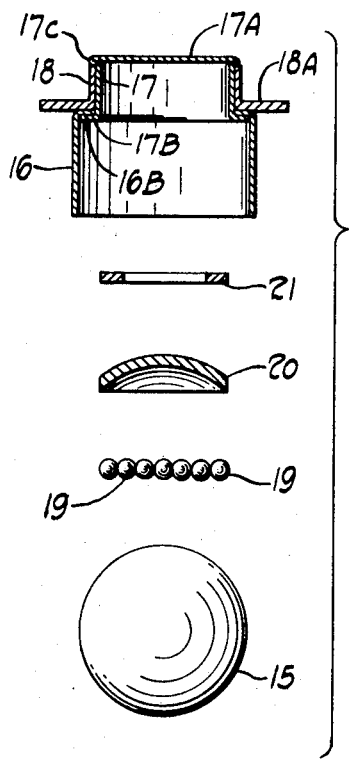
FIG. 3 is an exploded view of our caster with the parts depicted in the form and relative order of arrangement prior to assembly of the caster; and, FIG. 4 is an enlarged sectional view illustrating the detail of assembly of some of the parts.
Figure 4:
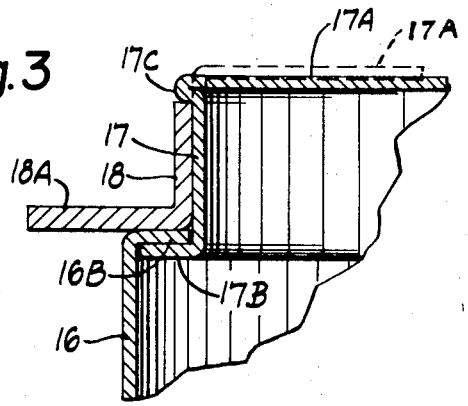

Our invention also includes a novel method of assembling such a ball caster. In FIG. 3, the parts are shown in partially disassembled condition after the assembly of the sleeve member 16, cup member 17 and annulus 18. Prior to the reduction of the end of sleeve member 16, to form reduced end 16A, it has a generally cylindrical form upon which the flange 16B is made. The cup member 17 is initially of generally cylindrical form and has the flange 17B formed at its open end. The end wall 17A is not initially formed with the ledge or shoulder 17C. After assembling the sleeve member 16 and cup member 17 so as to interlock or place in interengagement the flanges 16B and 17B the annulus 18 is slid downwardly in an axial direction so as to dispose its flange portion 18A over the flange 16B of sleeve member 16. A support, such as a solid cylindrical pin, is placed within the sleeve member 16 to engage and support the flange 17B. Thereafter by a press, hammer blow or other forming means, the ledge or shoulder 17C is provided by peening or deforming the end wall 17A to cause the metal to flow radially outwardly and thus extend over the top edge of the annulus 18. The parts are then in the relative positions shown in FIG. 3.

For final assembly, the washer 21 is placed within the cap member 17 adjacent the end wall 17A. Next the disc member 20 is placed within the cup member 17 adjacent, and in engagement with, the washer 21. Next, the plurality of backup balls 19 are placed within the cup member 17 to cover the concave spherical surface of the disc member 20 and in engagement therewith. Thereafter, the load-carrying ball 15 is placed within the sleeve member 16 in engagement with the backup balls 19. Finally the open end of the sleeve member 16 is contracted or reduced to form the reduced end portion 16A and thus to hold the ball 15 within the sleeve member 16. The caster is then in its assembled condition illustrated in FIG. 1.

The assembled ball caster may then be mounted to the lower end of a leg of furniture, for example the leg 11 shown in broken lines in FIG. 1. The leg 11 has a socket 12 shown in broken lines in FIG. 1. The upper cylindrical portion of the assembly is positioned within the socket 12 and three screws may be inserted through the screw openings 18B to hold the assembly to the lower end of the leg 11. The ball 15 protrudes outwardly from the sleeve member 16 so as to rollingly engage with a surface such as the floor surface 14 shown in broken lines in FIG. 1.

There is thus provided a strong and efficient ball caster made by an efficient and economical method. The parts are preferably made of a suitable metal, as for example the parts to be deformed are made of a deformable steel and the parts to receive thrust and friction are preferably made of appropriate strong and resistant steel.

The present disclosure includes that contained in the appended claims, as well as that of the foregoing description.

Although this invention has been described in its preferred form and preferred practice with a certain degree of particularity, it is understood that the present disclosure of the preferred form and preferred practice has been made only by way of example and that numerous changes in the details of construction and the combination and arrangement of parts and steps may be resorted to without departing from the spirit and the scope of the invention as hereinafter claimed.

We claim:

1. A method of making a ball caster comprising the steps of assembling a deformable metal cup member and a deformable metal sleeve member with interlocked flanges at the juncture of the cup member and sleeve member, and an annulus disposed around the cup member intermediate the interlocked flanges and a plane coinciding with an end wall of the cup member at an axial distance from the interlocked flanges, and deforming said end wall to overlap said annulus and to lock the same between the said deformed end wall and said interlocked flanges of the cup member and sleeve member.

2. The method as claimed in claim 1 and including the steps of positioning a disc member and a plurality of backup balls in said cup member and a load-carrying ball in the sleeve member in engagement with the backup balls, and contracting the sleeve member about the load-carrying ball to hold the load-carrying ball, backup balls and disc member in assembled condition.

3. The method as claimed in claim 2 and including the step of forming the disc member to have opposite concave and convex surfaces, disposing the concave surface toward and in engagement with the backup balls and the convex surface toward said end wall of the cup member, and placing between said end wall and said convex surface adjacent the outer periphery thereof a washer to brace said disc member against said end wall.